United States Patent [19]

Doty

[11] Patent Number: 4,757,954
[45] Date of Patent: Jul. 19, 1988

[54] BLOCK-OUT DEVICE FOR A RETRACTOR

[75] Inventor: Gerald A. Doty, Crown Point, Ind.

[73] Assignee: Gateway Industries, Inc., Olympia Fields, Ill.

[21] Appl. No.: 6,960

[22] Filed: Jan. 27, 1987

[51] Int. Cl.$^4$ .............................................. B60R 22/40
[52] U.S. Cl. ............................ 242/107.4 A; 280/803; 280/806
[58] Field of Search .................. 242/107.4 A, 107.4 B; 280/803, 806; 297/478, 280

[56] References Cited

U.S. PATENT DOCUMENTS

| 4,209,186 | 6/1980 | Close | 242/107.4 A X |
| 4,235,455 | 11/1980 | Collins et al. | 242/107.4 A X |
| 4,251,091 | 2/1981 | Weissner et al. | 242/107.4 A X |
| 4,570,873 | 2/1986 | Kurtti | 280/803 X |

Primary Examiner—John M. Jillions
Attorney, Agent, or Firm—Fitch, Even, Tabin & Flannery

[57] ABSTRACT

A safety belt retractor is provided with a frame that rotatably supports a reel carrying a rolled safety belt and with a pair of ratchet wheels on the opposite ends of the reel. A locking bar is pivotally mounted with respect to the frame for travel into engagement with the ratchet wheels to prevent protraction of the safety belt from the reel. An inertia-sensitive device is mounted on the frame and is movable with respect thereto to actuate the locking bar for engagement with the ratchet wheels. A block-out device for preventing the locking bar from engaging the ratchet wheels when the vehicle door is opened includes a solenoid with a plunger movable in response to the opening of the car door. A rock lever is pivotally mounted with respect to the frame and operatively connected to the plunger. A block-out member is pivotally mounted with respect to the stationary shaft and have a first end operatively connected to the lever, the second end being free and movable into a blocking position to prevent engagement of the locking bar with the ratchet wheels. The block-out device is configured so that when the lever pivots in response to the opening of the car door, the moment exerted on the lever by the solenoid plunger is in the same direction as any moment that would be exerted on the lever due to the locking bar engaging the block-out member.

6 Claims, 2 Drawing Sheets

BLOCK-OUT DEVICE FOR A RETRACTOR

BACKGROUND OF THE INVENTION

The present invention relates to a safety belt retractor and, more particularly, to an improved block-out mechanism that more reliably prevents during normal conditions the lockup of the reel on which the seat belt web is wound, while still allowing lockup of the reel in emergency situations.

Inertia-activated safety belt systems that prevent extraction of the safety belt from the reel based upon the acceleration forces exerted on its associated vehicle are conventional and well known. Such retractors generally include a safety belt wound on a reel that has ratchet wheels disposed on the opposite ends thereof. An inertia weight acts either directly or indirectly upon a lock bar to pivot the lock bar into locking engagement with the ratchet wheel teeth to prevent rotation of the reel so as to prevent further protraction of the safety belt therefrom.

Federal regulations have resulted in the increasing use of "automatic" or "passive" safety belt systems, i.e., safety belt systems that automatically position themselves about a vehicle occupant without any conscious effort of the occupant to utilize the system. Such systems often include door-mounted, safety belt retractors in which the safety belt is anchored inward of the occupant's seat and automatically crosses the occupant's body upon his or her entrance into the automobile and closing of the vehicle door.

During the opening of the car door, the inertia-sensitive, reel-locking device associated with the retractor on the door is likely to be subjected to acceleration forces sufficient to actuate the device and lock the retractor reel. This undesired locking of the reel, which would prevent the opening of the vehicle door, is, at the least, an annoyance to the vehicle user.

Consequently, it has been proposed that door-mounted safety belt retractors include a mechanism that operates, upon opening of the vehicle door, to block-out or prevent the lock bar from engaging the teeth of the ratchet wheels so that the safety belt may freely unwind from the reel. While the function of such lock bar block-out devices is to prevent the locking of the safety belt under acceleration forces typically encountered in the opening of the vehicle door, it may still be desirable to have the reel able to lock-up at very high force levels, e.g., three G's or greater when the door is open. However, because of these somewhat contradictory goals to block out the lock bar when the door is opened in the course of entering and exiting the vehicle, yet allowing the lock bar to engage the ratchet teeth of the belt reel and lock the reel against unwinding when the door is opened and at higher force levels, difficulties have been encountered in the design of an effective block-out device.

Accordingly, it is the principle object of the present invention to provide an improved lock bar block-out device for use in door-mounted safety belt retractors.

More particularly, it is an object to provide a lock bar block-out device that more reliably prevents the lock bar from engaging the ratchet teeth of the belt spool when the car door to which the retractor is mounted is opened for normal exiting and entering, but permits the lock bar to lock the reel against rotation when the car door is ajar and higher levels of acceleration are applied to the vehicle.

These objects, as well as others that will become apparent upon reference to the following detailed description and accompanying drawings, are provided by a door-mounted safety belt retractor having an elongated frame that rotatably supports a reel carrying a rolled safety belt and having a pair of ratchet wheels on the opposite ends thereof. A locking bar is pivotally mounted with respect to the frame for travel into engagement with the ratchet wheels to prevent protraction of the safety belt from the reel. An inertia-sensitive device is mounted on the frame and is movable with respect thereto to actuate the locking bar for engagement with the ratchet wheels. A block-out device for preventing the locking bar from engaging the ratchet wheels when the vehicle door is opened during normal entering and exiting of the vehicle includes a solenoid with a plunger movable in response to the opening of the car door. A rock lever is pivotally mounted with respect to the frame and operatively connected to the plunger. A block-out means is pivotally mounted and actuated by the rock lever between a non-blocking and a blocking position. The preferred block out means comprises a pivotally mounted member having a first end operatively connected to the lever and a second free end movable into a position to prevent engagement of the locking bar with the ratchet wheels.

BRIEF DESCRIPTION OF THE DRAWINGS

FIG. 3 is a fragmentary elevational view of the device of FIG. 2 positioned to permit engagement of the locking bar with the ratchet wheels; and FIG. 4 is a fragmentary view of a preferred embodiment of the block-out device that permits fail-safe operation of the locking bar.

DETAILED DESCRIPTION OF THE PREFERRED EMBODIMENT

Figure 1:
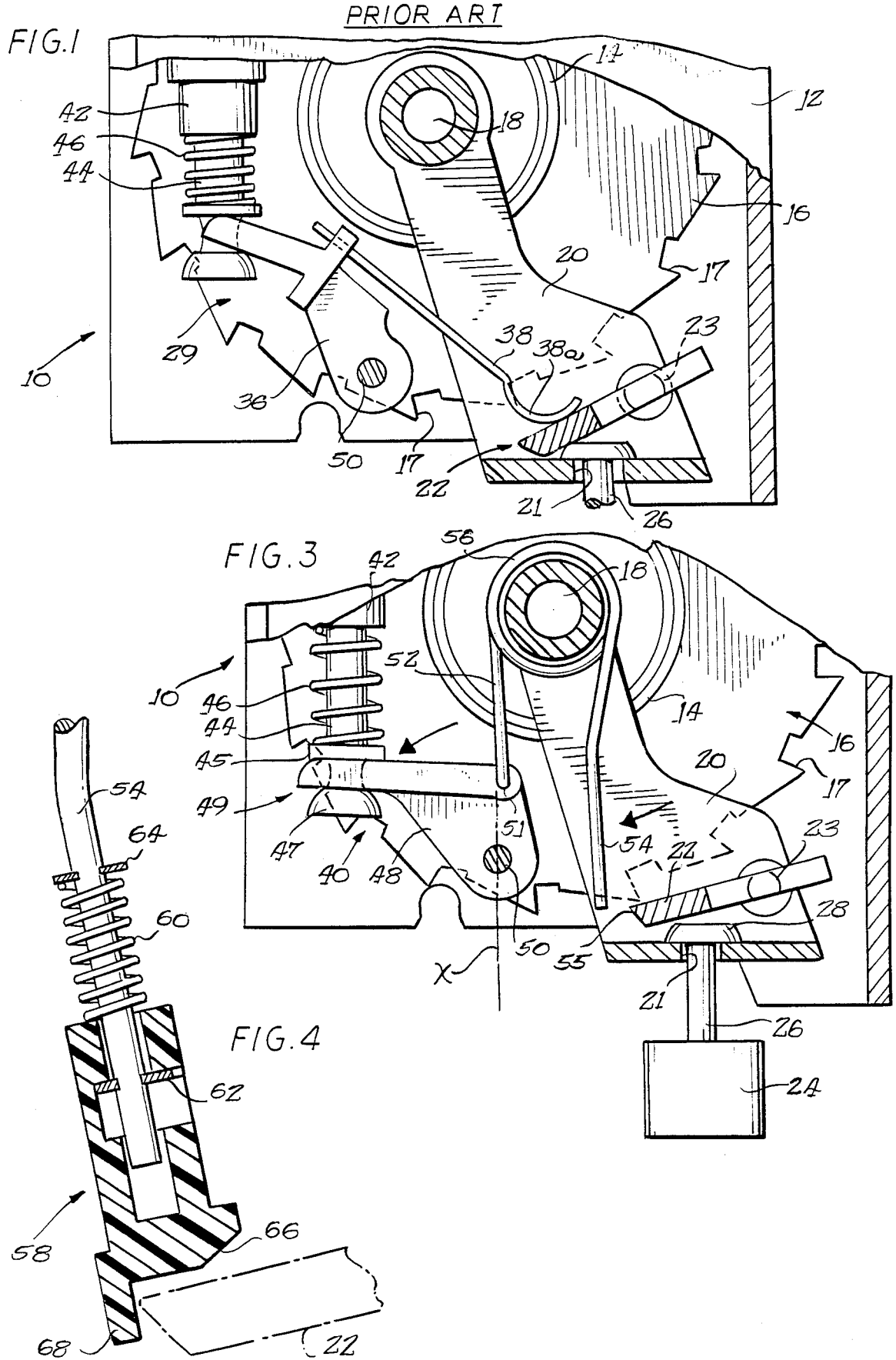
FIG. 1 is a fragmentary elevational view of a seat belt retractor that includes a block-out device.

The particular advantages of the present invention are best appreciated after a brief examination of the problems associated with a block-out device illustrated in FIG. 1. With reference to FIG. 1, a seat belt retractor, generally indicated by 10 and typically mounted in the vehicle door, includes an elongated, U-shaped metal frame 12 that supports between its side walls a reel 14 having a pair of metal ratchet wheels 16 on the opposite ends thereof mounted on a rotatable shaft 18. The retractor is a conventional retractor having a coiled spring to rewind the seat belt into the reel 14. The reel 14 carries a rolled safety belt (not shown) and is generally free to rotate in a direction to permit protraction of the safety belt web from the reel 14 (a counter-clockwise direction as viewed in FIG. 1). The reel is spring loaded to urge rotation in a clockwise direction to take up any slack in the webbing occurring during various normal movements of the wearer.

Mounted on the rotatable shaft 18 is a support bracket 20 that carries a metal locking bar 22 that is pivotally mounted to turn about ends 23 thereof pivoted in the bracket 20 to swing into engagement with teeth 17 on the rachet wheels 16 to prevent rotation of the reel 14 in a counterclockwise or unwinding direction. To so move the locking bar 22 in response to acceleration forces exerted on the vehicle, the bracket 20 also supports an inertia or pendulum weight (a fragment of which is shown in FIG. 1, but which is more fully illustrated in FIGS. 2 and 3 and is designated by 24) underlying the locking bar 22. The inertia weight 24 includes a stem portion 26 that extends through an aperture 21 in the bottom of the bracket 20. The upper portion of the stem 26 terminates in a head 28 that, upon tilting of the weight 24 due to excessive inertia forces, engages the locking bar 22 to force the same into engagement with the teeth on the ratchet wheels 16 in a conventional manner.

In order to prevent undesired engagement of the locking bar 22 with the ratchet wheels 16 during the opening of the door, it has heretofore been suggested to use a block-out device, generally indicated by 29, which is associated with the retractor 10 and includes a solenoid 42 mounted to the frame 12 and having a plunger 44 that is retracted to the position shown in FIG. 1 against the force of a return spring 46 upon the opening of the vehicle door. Pivotally mounted on a pivot stud 50 to the retractor frame 12 and in forked engagement with the end of the solenoid plunger 44 is a rock lever 36 that carries a spring or wire arm 38. The spring arm 38 has a lower, curved end 38a that, when the plunger 44 is retracted upon the opening of the vehicle door, pushes against the upper surface of the locking bar 22 (as seen in FIG. 1) with sufficient force to inhibit movement of the locking bar 22 into engagement with the teeth 17 of the ratchet wheels 16. The arm 38 is designed to be sufficiently flexible so that, if the force exerted on the locking bar 22 by the inertia weight 24 exceeds a predetermined minimum (e.g., 3 G's) greater than that typically encountered during the normal opening and closing of the vehicle door, the arm 38 will bend to provide a fail-safe operation and permit the locking bar 22 to engage the teeth of the ratchet wheels 16 to prevent unwinding of the safety belt.

The solenoid 30 is limited in its power and amount of travel and when acting through the spring arm 38 cannot consistently block out the locking bar 22 from swinging into engagement with the ratchet teeth when a substantial force is applied to the inertia weight 24. Thus, there is a need for modifying the system shown in FIG. 1 to consistently block-out the locking bar at force levels up to a predetermined level e.g. three G's; and, if desired, to allow the locking bar to swing into locking position at higher G loads above three G's. Also, the inertia weight 24 acts, when the door is swung with a high acceleration, to lift the locking bar and exert through the spring 38 a moment on the rock lever 36 in a counteracting direction to the moment exerted on the rock lever 36 by the retraction of the solenoid plunger 44. Because of the small size of the solenoid 42, the short throw of the plunger 44, and the flexible nature of the wire arm 38, the counteracting upward moment on the wire arm 38 from the locking bar and inertia weight during the opening of the vehicle door occasionally exceeds the downward moment created on the rock lever 36 by the solenoid 42, resulting in the undesired locking of the ratchet wheels 16.

Figure 2:
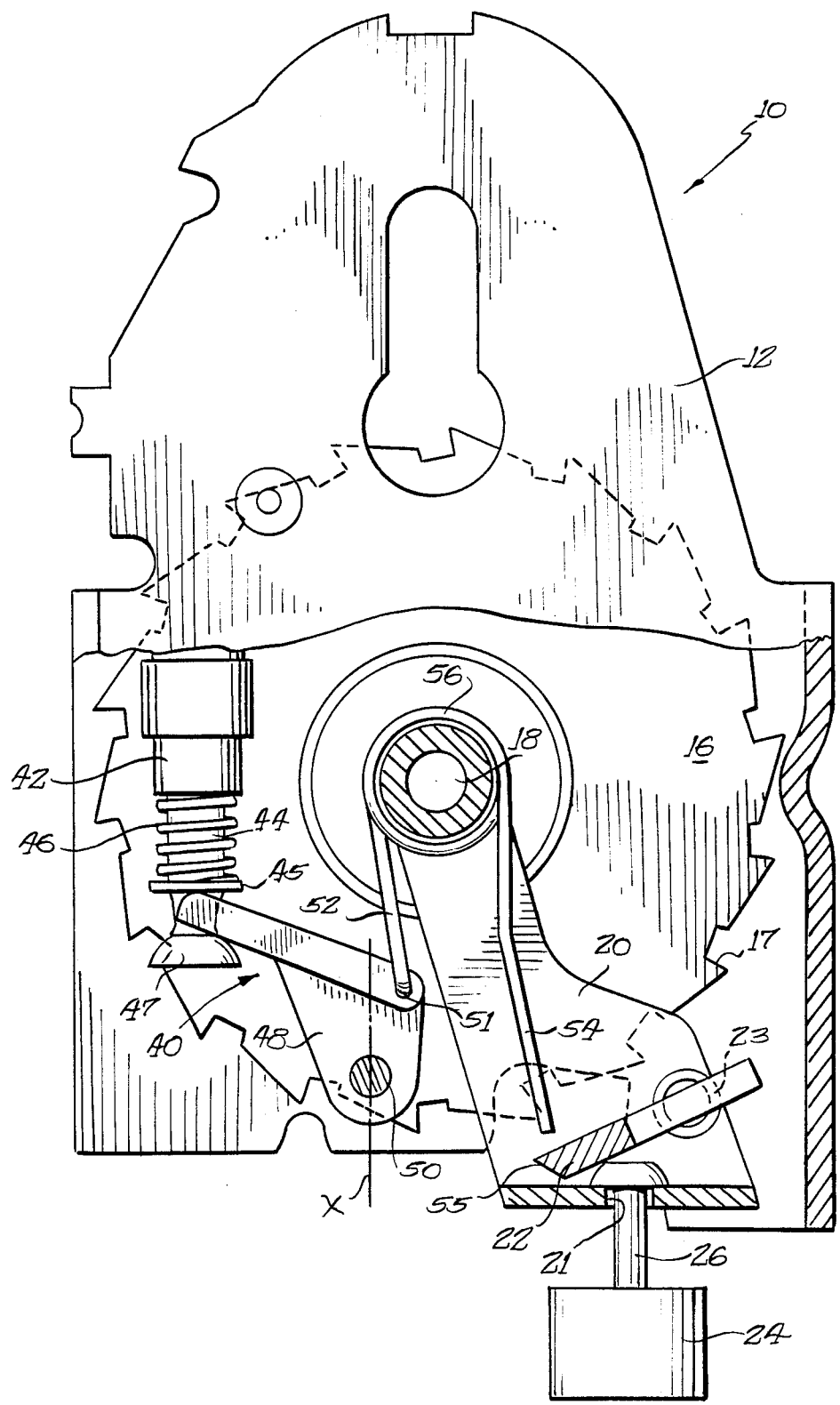
FIG. 2 is an elevational view of a seat belt retractor employing an improved block-out device constructed in accordance with the invention.

In accordance with the present invention, a more reliable block-out device, generally indicated by 40, is illustrated in FIGS. 2 and 3. (The other features of the retractor of FIGS. 2 and 3 are substantially the same as those of the retractor of FIG. 1, and identical reference numerals are used to designate the common elements.)

In accordance with the present invention, as illustrated in FIGS. 2-4, a new and improved blocking device is provided which is designed to block the locking bar 22 at G's loads of up to three or more G's when using the same solenoid 42 as above described. More specifically, the blocking device includes a blocking member 52 which is pivotally mounted on the shaft 18 and which has a portion or free end 54 which is movable from a release or non-blocking position, such as shown in FIG. 3, to a blocking position, such as shown in FIG. 2, in which the free end 54 is positioned directly over nose portion 55 of the locking bar. If the inertia weight were to lift the nose 55 of the locking bar to abut the free end 54 of the blocking member 52, the force will be directed mostly upward at the shaft 18 with a small moment tending to turn the blocking member 52 in the counterclockwise blocking direction which is the direction of assuring more blocking. That is, the plunger 44 is pulled inwardly and upwardly when energized to swing the blocking member 52 counterclockwise from the non-blocking position of FIG. 3 to the blocking position of FIG. 2. The block-out member is configured so that when the member is acted upon by the locking bar 22, a moment is exerted on the rock lever that tends to rotate the lever in the same counterclockwise direction as the moment exerted on the lever by the solenoid. Thus, the moment created by the solenoid is not required to counteract the force exerted on the locking bar by the inertia weight in order to block out the locking bar, but is actually reinforced to prevent the undesired locking of the ratchet wheels.

Turning now in greater detail to the device shown in FIGS. 2 and 3, the block-out device 40 includes a solenoid 42 mounted to the frame 12 and having a plunger 44 movable between a retracted position (shown in FIG. 2) upon the opening of the vehicle door and an extended position (FIG. 3), toward which the plunger 44 is urged by a return spring 46 when the door is closed. A rock lever 48 is pivotally mounted to the retractor frame 12 on a stud 50 and has a forked end 49 captured in forked engagement between enlarged flanges 45 and 47 on the end of the plunger 44.

The illustrated rotatable block-out member 52 is pivotally connected at one end 51 to the rock lever 48 and extends to and around the reel shaft 18 with another end 54 of the block-out member 52 extending beyond the tips of the teeth 17 of the ratchet wheels 16. As seen in FIG. 2, when the solenoid 42 is activated to retract the plunger 44, the rock lever 48 is pivoted clockwise, as shown in FIGS. 2 and 3, to rotate the block-out member 52 so that its free end 54 is interposed between the locking bar 22 and the teeth of the rachet wheels 16 to prevent the inter-engagement thereof. The rock lever 48 is configured so that a clockwise moment (as viewed in FIG. 2) is exerted thereon by both the retracting solenoid plunger 44 and the block-out member 52, should the latter be engaged by the locking bar 22. As illustrated, this is accomplished by having the free end of the block-out member engage the lock bar to the right of its pivot axis at the shaft 18, as seen in FIG. 3, so that the other end of block-out member moves downwardly to rock the lever 48 clockwise as the lock bar 22 pushes upwardly on the free end 54 of the lock out member. Thus, when the block-out member 52 is rotated to the position of FIG. 2 with the free end 54 in the blocking position, engagement of the locking bar 22 with the block-out member 52 will only serve to increase the blocking force and not counteract the force of the retracted solenoid plunger 44, which would tend to rotate the block-out member out of engagement with the locking bar. The block-out member 52 may be made of wire and, as illustrated, includes an intermediate coil 56 that is coiled about the shaft 18. Once the vehicle door is closed, the electrical circuit for the solenoid is de-energized and, the plunger 44 is returned by the spring 46 to the position of FIG. 3, rotating the blocking member 52 away from the blocking bar 22 and allowing the locking bar to freely engage the teeth of the ratchet wheels in response to the movement of the inertia weight 24.

In a preferred embodiment, means is provided for allowing fail-safe engagement of the lock bar 22 with the teeth of the ratchet wheels 16 under excessive inertial forces due to, e.g., a collision, despite the block-out member 52 being interposed to prevent such engagement. With reference to FIG. 4, the free end 54 of the block-out member 52 includes a spring-loaded sliding foot member 58, that is able to move axially with respect to the free end 54 of the block-out member 52 against the force of a helical spring member 60. The sliding foot 58 is captured on the free end 54 by a snap ring 62 and the spring 60 is captured on the free end 54 between sliding foot 58 and a second snap ring 64. The foot 58 includes a lead-in chamfer 66 at the distal end thereof to ensure that the block-out member 52 will move into blocking position and will not be itself blocked from moving into such position by the locking bar 22. The foot 58 also includes a projecting stop portion 68 that serves to positively locate the sliding foot with respect to the locking bar 22 when engaged by the same. The spring 60 is pre-loaded to preferably exert, in its expanded condition, a force on the sliding foot 58 of approximately 3 G's. Thus, the foot 58 will not slide up the free end 54 of the block-out member 52 until the inertia member 24 exerts a force on the locking bar of greater than 3 G's. Thus, even with the vehicle door open and the block-out member 52 positioned to prevent the ratchet wheels 16 from being locked by the locking bar 22, if the force on the inertia weight 24 is great enough, the locking bar 22 can be forced into engagement with the teeth of the ratchet wheels 16 against the force of the sliding foot 58 to permit fail-safe locking of the retractor 10.

Thus, it can been seen that a new and improved block-out device for a retractor has been provided, and that, it fully meets the objects set forth above.

While the invention has been described in terms of a preferred embodiment, there is no intent to limit the invention to the same. On the contrary, it is intended to cover all modifications and equivalents within the scope of the appended claims.

What is claimed is:

1. In a seat belt retractor the combination comprising:
   a frame means for the retractor;
   a reel rotatably mounted on the frame for winding and unwinding a seat belt on the reel;
   ratchet wheels on the reel;
   a locking bar mounted on the frame for pivoting between a locking position in locking engagement with the ratchet wheels and a release position spaced from the ratchet wheels;
   inertia means operable with a sudden change in inertia above a predetermined level to urge the locking bar into the locking positon;
   a solenoid having a plunger movable between an extended and a retracted position;
   a block out lever mounted to said frame means and actuated by said solenoid;
   a block out means having a first portion actuated by said block out lever and having a second portion movable from a non-blocking position for said locking bar to a blocking position for blocking movement of the locking bar into engagement with said ratchet wheels;
   said block out means including a pivotally mounted blocking member pivotally mounted on the frame to turn about an axis of rotation;
   said first portion of said block out means comprising a first end of said block out member being pivotally connected to said block out lever, and said second portion comprising a portion disposed over said locking bar.

2. A retractor in accordance with claim 1 in which said blocking member comprises a wire member having a central coiled portion mounting the wire member for pivoting about said axis of rotation.

3. In a seat belt retractor the combination comprising:
   a frame means for the retractor;
   a reel rotatably mounted on the frame for winding and unwinding a seat belt on the reel;
   ratchet wheels on the reel;
   a locking bar mounted on the frame for pivoting between a locking position in locking engagement with the ratchet wheels and a release position spaced from the ratchet wheels;
   inertia means operable with a sudden change in inertia above a predetermined level to urge the locking bar into the locking position;
   a solenoid having a plunger movable between an extended and a retracted position;
   a block out lever mounted to said frame means and actuated by said solenoid;
   a block out means having a first portion actuated by said block out lever and having a second portion movable from a non-blocking position for said locking bar to a blocking position for blocking movement of the locking bar into engagement with said ratchet wheels;
   said block out means including a spring biased member for abutting the locking bar and for holding the locking bar against movement into said ratchet wheels until a predetermined force has been applied to deflect the spring biased member;
   said spring biased member comprising a slideable plunger to engage the locking bar and a spring abutting the plunger and holding the plunger against sliding until said predetermined force level is exceeded to deflect said spring.

4. In a door-mounted safety belt retractor, an elongated frame, a reel having a pair of ratchet wheels and a belt rolled thereon mounted for rotation on said frame,
   a locking bar pivotally mounted with respect to the frame for travel into engagement with the ratchet wheels on the reel to stop protraction of the belt from the reel;
   an inertia-sensitive member mounted on the frame and movable with respect thereto for actuation of the locking bar into engagement with the ratchet wheels,
   solenoid means including a plunger responsive to the opening of the door,
   lever means pivotally mounted with respect to the frame and operatively connected to the plunger of the solenoid means to pivot the lever means in a first direction upon opening the door and in a second direction when the door is closed, and a block-out member having a first end operatively connected to the lever means and a second end for engagement with the locking bar so that when the lever means pivots in the first direction the second end of the block-out member is moved into a position to block engagement of the locking bar with the ratchet wheels, means mounting the block-out member for movement such that the force exerted on the block-out member by the locking bar creating a moment on the lever means in a direction to further pivot the lever means in the first direction.

5. The combination of claim 4 wherein the block-out member includes a portion intermediate the first and second ends that is coiled about the shaft.

6. The combination of claim 4 wherein the second end of the block-out member includes spring-loaded plunger means for engagement with the locking bar, the spring being pre-tensioned so that the plunger moves with respect to the first end of the block-out means to permit engagement of the locking bar with the ratchet wheels only after a predetermined minimum force has been exerted on the lock bar by the inertia-sensitive member.

* * * * *